US012566608B2

(12) United States Patent
Robson et al.

(10) Patent No.: US 12,566,608 B2
(45) Date of Patent: Mar. 3, 2026

(54) METHODS AND SYSTEMS FOR DATA TRANSFER

(71) Applicant: Arm Limited, Cambridge (GB)

(72) Inventors: John David Robson, Cambridge (GB); Kévin Petit, Great Wilbraham (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/660,683

(22) Filed: May 10, 2024

(65) Prior Publication Data

US 2024/0394061 A1 Nov. 28, 2024

(30) Foreign Application Priority Data

May 24, 2023 (GB) ..................................... 2307750

(51) Int. Cl.
*G06F 9/30* (2018.01)
(52) U.S. Cl.
CPC ........ *G06F 9/30145* (2013.01); *G06F 9/3004* (2013.01)
(58) Field of Classification Search
None
See application file for complete search history.

(56) References Cited

U.S. PATENT DOCUMENTS 6,021,469 A * 2/2000 Tremblay .............. G06F 9/3017
712/E9.082
11,321,092 B1 * 5/2022 Raikin ................ G06F 9/30036

2022/0206800 A1 * 6/2022 Ould-Ahmed-Vall .......................
G06F 9/30043
2022/0206943 A1 * 6/2022 Chen ................... G06F 12/0802
2022/0342830 A1 * 10/2022 Chen ................... G06F 12/1441
2023/0090973 A1 3/2023 Ray et al.
2025/0077439 A1 * 3/2025 Medwed ............. G06F 12/1458

OTHER PUBLICATIONS

Combined Search and Examination Report under Sections 17 and 18(3), App. No. GB2307750.6, Mailed Nov. 23, 2023, 8 pages.
Search Report under Section 17(6), App. No. GB2307750.6, Mailed Jan. 26, 2024, 2 pages.

* cited by examiner

*Primary Examiner* — Eric Coleman
(74) *Attorney, Agent, or Firm* — Berkeley Law & Technology Group, LLP

(57) ABSTRACT

Disclosed is an apparatus comprising: instruction decoding circuitry; data storage; and processing circuitry to process data responsive to an instruction decoded by instruction decoding circuitry configured to, responsive to a data transfer instruction specifying a data source and a region of the source to perform data transfer, control processing circuitry to: when the data transfer operation comprises an out-of-bounds memory access corresponding to an attempt to read data outside the indicated region of source storage, read data not associated with the out-of-bounds memory access from source storage and write data not associated with the out-of-bounds memory access to a first portion of target storage by overwriting preloaded values stored in the first portion of the target storage; and omit writing to a different second portion of the target storage data associated with the out-of-bounds memory access to preserve preloaded values stored in the second portion of target storage.

15 Claims, 5 Drawing Sheets

300

S310

Decode data transfer
instruction

S320

Read data not associated
with out-of-bounds
memory access from
source storage

S330

Write data not associated
with out-of-bounds
memory access to a first
portion of target storage

S340

Preserve preloaded values
in a second portion of
target storage

Simulator Implementation

METHODS AND SYSTEMS FOR DATA TRANSFER

FIELD OF THE INVENTION

The present technology relates to data processing and data processing apparatuses and systems, in particular to data transfer to or from register storage.

BACKGROUND

In data processing systems, when data is required by an operation or when data is generated as a result of performing an operation, the data may for example be transferred to or from register storage, e.g. having been fetched from system memory or to be backed in system memory. Data transfer instructions may be used in data processing to control the transfer of data to or from register storage.

For some operations, e.g. in machine learning (ML) systems, operands and results are stored as tensors. Some ML operations require the input tensor to be of a predetermined dimension, e.g. to satisfy the semantics of the operation or to enable efficient implementation using vector processing. If the input tensor of an operation is not of the predetermined dimension required for the operation, the input tensor may be padded (i.e. setting the value of tensor elements beyond the dimension of the input tensor to a predefined value) until it reaches the predetermined dimension.

There may be occasions when a data processing system receives an input tensor for an operation that does not meet the dimension requirement for the operation, e.g. when the input tensor has been insufficiently padded. In one approach, the system may copy the input tensor in memory and manipulate the copied tensor to achieve the required dimension before transferring the manipulated copy to register storage for use by the operation, or, in another approach, the system may revert to another implementation of the operation (e.g. using scalar processing and/or scalar remainder processing with an additional control flow) to process the input tensor. However, the former approach leads to additional processing and requires additional memory resources, while the latter approach can lead to less efficient implementations of the operation being used, and so these approaches can lead to an increase in power and resource consumption and a reduction in performance.

There is therefore scope for improving data handling in data processing systems with specific dimension requirements for input data.

SUMMARY OF THE INVENTION

In view of the foregoing, an aspect of the present technology provides apparatus comprising: instruction decoding circuitry to decode instructions; storage to store data; and processing circuitry to perform data processing in response to an instruction decoded by the instruction decoding circuitry, wherein, the instruction decoding circuitry is configured to, in response to a data transfer instruction specifying a source storage to be accessed for data and an indication of a region of the source storage to perform a data transfer operation, control the processing circuitry to: when the data transfer operation comprises at least one out-of-bounds memory access, wherein the at least one out-of-bounds memory access corresponds to an attempt to read data that is outside of the indicated region of the source storage specified in the data transfer instruction, read data not associated with the at least one out-of-bounds memory access from the source storage and write the data not associated with the at least one out-of-bounds memory access to a first portion of a target storage by overwriting preloaded values stored in the first portion of the target storage; and omit writing to a different second portion of the target storage data associated with the at least one out-of-bounds memory access to preserve preloaded values stored in the second portion of the target storage.

According to embodiments of the present technology, when accessing a source storage, e.g. memory, to read data from an indicated region of the source storage to write the data to a target storage, e.g. register storage, the data read from the indicated region of the source storage overwrites preloaded values in the target storage. For example, each data value read from the indicated region of the source storage overwrites the preloaded value stored at a location of the target storage. If the data transfer operation comprises at least one out-of-bounds memory access, that is, an attempt to read data that is outside of the indicated region of the source storage, data associated with the at least one out-of-bounds memory access is not written to the target storage. In doing so, data read from the indicated region of the source storage is written to a first portion of the target storage, thus overwriting the preloaded values in the first portion of the target storage, while data associated with the at least one out-of-bounds is not written to the remaining, second, portion of the target storage, preserving the preloaded values in the second portion of the target storage. Herein, the notion of "first" and "second" in relation to portions of the target storage is merely used to distinguish different portions of the target storage; the notion does not represent any chronological, positional, or size order. Thus, it can be seen that, irrespective of the amount of data to be read from the indicated region of the source storage, the target storage is always filled by desired values only-non out-of-bounds data or the preloaded values. The present approach can be implemented in many different applications. For example, the present approach can be useful for data processing operations that require a specific number of elements and when the number of data values does not match the specific number of elements a padding value specific to the data processing operations must be used. In such examples, data required for the operation may be read from a region of a source storage and written to a target storage, e.g. a register, to be used when performing a data processing operation, and the reading of the region of the source storage may include out-of-bounds memory accesses. Conventional approaches may treat such out-of-bounds memory accesses as if zeros are read, but zeros may not be the padding value that is accepted by the data processing operation, in which case additional steps must be performed to replace the zeros with the accepted padding value. Through embodiments of the present technology, data read from the region of the source storage overwrites preloaded values in a portion (first portion) of a target storage, while data associated with out-of-bounds memory accesses are omitted to preserve the preloaded values in the remaining portion (second portion) of the target storage, such that the desired number of elements is ensured in a single step. This may for example be of particular relevance to machine learning systems in which data is typically stored and processed in the form of a data tensor having a predetermined size/dimension. The present approach ensures the target storage has stored thereon the desired number of elements, being data values or preloaded values (e.g. an appropriate padding value) without the need to e.g. first determine the size of the indicated region of the source storage and/or the number of data values stored thereon. Moreover, by omitting the data associated with out-of-bounds memory accesses when writing to the target storage, both a step of writing the out-of-bounds data and a step of overwriting the out-of-bounds data with an appropriate padding value may be eliminated, leading to faster, less time-consuming data loading with reduced bandwidth and power requirements.

In some embodiments, the target storage may have stored therein a plurality of preloaded values. For example, the target storage may be preloaded with a desired padding value offline, such that during run time, the preloaded target storage is ready for use.

An implementation of the present technology may provide an apparatus comprising: instruction decoding circuitry to decode instructions; storage to store data; and processing circuitry to perform data processing in response to an instruction decoded by the instruction decoding circuitry, wherein, the instruction decoding circuitry is configured to, in response to a data transfer instruction specifying a source storage to be accessed for data, an indication of a region of the source storage, and a padding value to perform a data transfer operation, control the processing circuitry to: when the data transfer operation comprises at least one out-of-bounds memory access, wherein the at least one out-of-bounds memory access corresponds to an attempt to read data that is outside of the indicated region of the source storage specified in the data transfer instruction, read data not associated with the at least one out-of-bounds memory access from the source storage and write the data not associated with the at least one out-of-bounds memory access to a first portion of a target storage; and write to a different second portion of the target storage the padding value specified in the data transfer instruction instead of data associated with the at least one out-of-bounds memory access.

According to alternative implementations of the present technology, the data transfer instruction specifies a padding value to be used in respect of out-of-bounds memory accesses. When a source storage, e.g. memory, is accessed to load data from an indicated region of the source storage to a target storage, e.g. register storage, the data (not associated with out-of-bounds memory accesses) read from the indicated region of the source storage is written to the target storage. If the data transfer operation comprises at least one out-of-bounds memory access, data associated with the at least one out-of-bounds memory access is omitted from the target storage; instead, the padding value specified in the data transfer instruction is written to the target storage. In doing so, (non out-of-bounds) data read from the indicated region of the source storage is written to a first portion of the target storage, while the padding value specified in the data transfer instruction is written to the remaining, second, portion of the target storage. Herein, the notion of "first" and "second" in relation to portions of the target storage is merely used to distinguish different portions of the target storage; the notion does not represent any chronological, positional, or size order. Thus, irrespective of the amount of data to be read from the indicated region of the source storage, the target storage is always filled by the desired values only-non out-of-bounds data or the padding value specified in the data transfer instruction. Similar to the first approach, the present second approach can be implemented in many different applications, in particular in data processing operations that require a specific number of elements and accept only padding values specific to the data processing operations. Through embodiments of the present technology, data read from the indicated region of the source storage is written to a portion (first portion) of a target storage, while data associated with out-of-bounds memory accesses are omitted and a padding value specified in the data transfer instruction is written to the remaining portion (second portion) of the target storage, such that the desired number of elements with appropriate padding values are ensured. By omitting the data associated with out-of-bounds memory accesses when writing to the target storage and instead writing the specified padding value, the present second approach ensures the target storage has stored thereon the desired number of elements, being data values or appropriate padding values, without the need to first writing the out-of-bounds data and then overwriting the out-of-bounds data with the appropriate padding value, leading to faster, less time-consuming data loading with reduced bandwidth and power requirements.

In some embodiments, the indication of the region of the source storage may comprise a start location of the source storage and a size of the source storage. For example, the indication of the region of the source storage may comprise a start address and a range of addresses to be read.

In some embodiments, the processing circuitry is configured to determine the at least one out-of-bounds memory access based on the indication of the region of the source storage and a size of the target storage. For example, the processing circuitry may compare the dimension of the target storage with e.g. the size of the indicated region of the source storage, the number of data values stored in the indicated region of the source storage, the range of addresses within the indicated region of the source storage, etc. to determine whether the data transfer operation comprises at least one out-of-bounds memory access.

In some embodiments, the processing circuitry may be configured to, in a first out-of-bound operation mode, handle the at least one out-of-bounds memory access by returning a predetermined value as the data associated with the at least one out-of-bounds memory access. For example, the predetermined value to be returned may be zero.

In some embodiments, the processing circuitry may be configured to select a second out-of-bounds operation mode to disregard the data associated with the at least one out-of-bounds memory access.

The target storage may comprise, exclusively or non-exclusively, one-dimensional register storage for storing one-dimensional data. In some embodiments, the target storage may, partially or completely, comprise multi-dimensional array register storage to store at least one multi-dimensional array of data, as desired.

Another aspect of the present technology provides a computer-implemented method comprising: operating instruction decoding circuitry to decode instructions; operate storage to store data; and operate processing circuitry to perform data processing in response to an instruction decoded by the instruction decoding circuitry, the method further comprising, in response to a data transfer instruction decoded by the instruction decoding circuitry specifying a source storage to be accessed for data and an indication of a region of the source storage to perform a data transfer operation, the processing circuitry: when the data transfer operation comprises at least one out-of-bounds memory access, wherein the at least one out-of-bounds memory access corresponds to an attempt to read data that is outside of the indicated region of the source storage specified in the data transfer instruction, reading data not associated with the at least one out-of-bounds memory access from the source storage and writing the data not associated with the at least one out-of-bounds memory access to a first portion of a target storage by overwriting preloaded values stored in the first portion of the target storage; and omitting writing to a different second portion of the target storage the data associated with the at least one out-of-bounds memory access to preserve preloaded values stored in the second portion of the target storage.

A further aspect of the present technology provides a computer program product stored in a non-transitory computer-readable medium and comprising computer program instructions for controlling a host data processing apparatus to provide an instruction execution environment comprising: instruction decoding program logic to decode instructions; storage logic to store data; and processing program logic to perform data processing in response to an instruction decoded by the instruction decoding circuitry, wherein, the instruction decoding program logic is configured to, in response to a data transfer instruction specifying a source storage to be accessed for data and an indication of a region of the source storage to perform a data transfer operation, control the processing program logic to: when the data transfer operation comprises at least one out-of-bounds memory access, wherein the at least one out-of-bounds memory access corresponds to an attempt to read data that is outside of the indicated region of the source storage specified in the data transfer instruction, read data not associated with the at least one out-of-bounds memory access from the source storage and write the data not associated with the at least one out-of-bounds memory access to a first portion of a target storage by overwriting preloaded values stored in the first portion of the target storage; and omit writing to a different second portion of the target storage the data associated with the at least one out-of-bounds memory access to preserve preloaded values stored in the second portion of the target storage.

An alternative implementation of the present technology may provide a computer-implemented method comprising: instruction decoding circuitry decoding instructions; storage storing data; and processing circuitry to perform data processing in response to an instruction decoded by the instruction decoding circuitry, the method further comprising, in response to a data transfer instruction decoded by the instruction decoding circuitry specifying a source storage to be accessed for data, an indication of a region of the source storage, and a padding value to perform a data transfer operation, the processing circuitry: when the data transfer operation comprises at least one out-of-bounds memory access, wherein the at least one out-of-bounds memory access corresponds to an attempt to read data that is outside of the indicated region of the source storage specified in the data transfer instruction, reading data not associated with the at least one out-of-bounds memory access from the source storage and writing the data not associated with the at least one out-of-bounds memory access to a first portion of a target storage; and writing to a different second portion of the target storage the padding value specified in the data transfer instruction instead of the data associated with the at least one out-of-bounds memory access.

A further alternative implementation of the present technology provides a computer program comprising instructions for controlling a host data processing apparatus to provide an instruction execution environment comprising: instruction decoding program logic to decode instructions; storage to store data; and processing program logic to perform data processing in response to an instruction decoded by the instruction decoding circuitry, wherein, the instruction decoding program logic is configured to, in response to a data transfer instruction specifying a source storage to be accessed for data, an indication of a region of the source storage, and a padding value to perform a data transfer operation, control the processing program logic to: when the data transfer operation comprises at least one out-of-bounds memory access, wherein the at least one out-of-bounds memory access corresponds to an attempt to read data that is outside of the indicated region of the source storage specified in the data transfer instruction, read data not associated with the at least one out-of-bounds memory access from the source storage and write the data not associated with the at least one out-of-bounds memory access to a first portion of a target storage; and write to a different second portion of the target storage the padding value specified in the data transfer instruction instead of the data associated with the at least one out-of-bounds memory access.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which.

DETAILED DESCRIPTION

Figure 1:
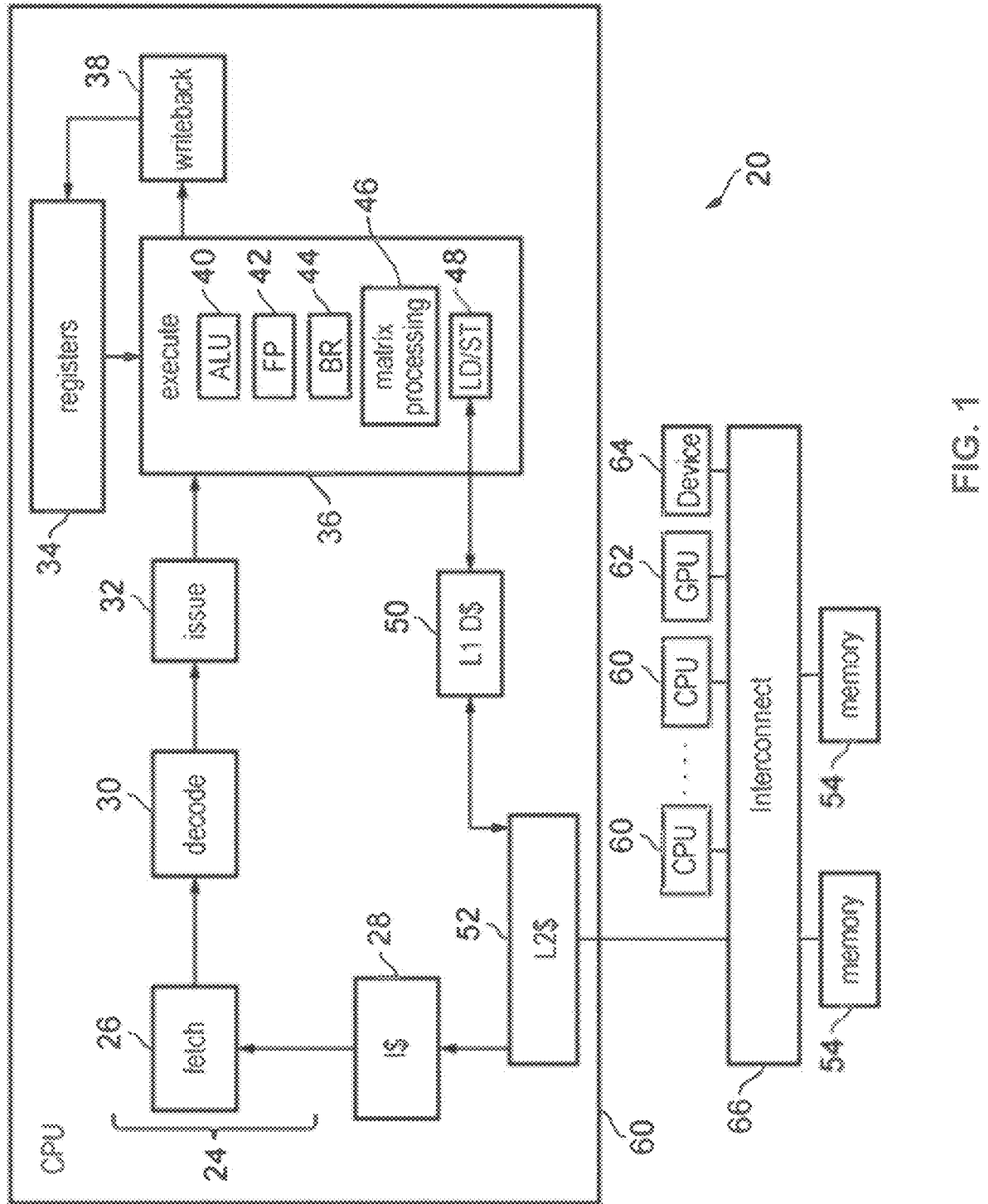
FIG. 1 schematically shows an exemplary data processing apparatus.

Typically, when data is to be read from memory and e.g. written to a register to be used as operand in the form of a tensor for an operation, in order for the data to be written to the register to form a data tensor having a dimension required (e.g. a required number of elements in each direction) by the operation, the number of data values to be read from memory must meet the required dimension; otherwise, one or more padding values accepted by the operation may be appended to the read data until the data tensor on the register comprises the required number of elements. If the data to be read from memory does not meet the required dimension, e.g. if the data has not been padded or the data has been insufficiently padded, a copy of the data may first be made in memory and then manipulated (padded) to reach the required dimension. Alternatively, a different implementation of the operation that can operate on the unpadded or insufficiently padded data may be used if copying and manipulating the copy is undesirable.

According to a first approach, when accessing a source storage, e.g. memory, to read data from an indicated region of the source storage to write the data to a target storage, e.g.

register storage, the data read from the indicated region of the source storage overwrites preloaded values in the target storage. If the data transfer operation comprises at least one out-of-bounds memory access, that is, an attempt to read data that is outside of the indicated region of the source storage, data associated with the at least one out-of-bounds memory access is not written to the target storage. Herein, out-of-bounds memory accesses refer to those parts of a requested data transfer that fall outside the bounds of a defined region in memory. For example, a LOAD instruction may have operands defining a start address and a size of the data to be loaded, and a base address and a size of the memory buffer from which to load. The instruction compares the address range of the requested data with the address range of the memory buffer, and only reads from memory the portion of the requested data which lies within the memory buffer. Data that is requested but falls outside the memory buffer is regarded as out-of-bounds and is handled differently. In another example, a STORE instruction only writes to memory the portion of the data that lies within an address range defined by a base address and a size of the memory buffer specified in the instruction; data with an address falling outside the specified range is regarded as out-of-bounds and typically discarded instead of being written to memory. Other embodiments of LOAD and STORE instructions, and any other instructions in relation to data transfer, are of course possible and have been contemplated in the context of the present technology, as will be appreciated by one skilled in the art.

In doing so, data read from the indicated region of the source storage is written to a first portion of the target storage, thus overwriting the preloaded values in the first portion of the target storage, while data associated with the at least one out-of-bounds is not written to the remaining, second, portion of the target storage, preserving the preloaded values in the second portion of the target storage. Herein, the notion of "first" and "second" in relation to portions of the target storage is merely used to distinguish different portions of the target storage; the notion does not represent any chronological, positional, or size order. It can be seen that, through application of the present approach, irrespective of the amount of data to be read from the indicated region of the source storage, the target storage is always filled by the desired values only-non out-of-bounds data or the preloaded values. Thus, in the event that e.g. there are fewer data values than memory locations on the target storage, memory locations on the target storage that are not written with a data value is left with the preloaded value.

The present approach can be implemented in many different applications. For example, the present approach can be useful for data processing operations that require a specific number of elements and when the number of data values does not match the specific number of elements a padding value specific to the data processing operations must be used. In such examples, data required for the operation may be read from a region of a source storage and written to a target storage, e.g. a register, to be used when performing a data processing operation, and the reading of the region of the source storage may include out-of-bounds memory accesses. Conventional approaches may treat such out-of-bounds memory accesses as if zeros are read, but zeros may not be the padding value that is accepted by the data processing operation, in which case additional steps must be performed to replace the zeros with the accepted padding value. Through application of the present approach, data read from the region of the source storage overwrites preloaded values in a portion (first portion) of a target storage, while data associated with out-of-bounds memory accesses are omitted to preserve the preloaded values in the remaining portion (second portion) of the target storage, such that the desired number of elements is ensured in a single step. This may for example be of particular relevance to machine learning systems in which data is typically stored and processed in the form of a data tensor having a predetermined size/dimension.

The present approach ensures the target storage has stored thereon the desired number of elements, being data values or preloaded values (e.g. an appropriate padding value), without the need to e.g. first determine the size of the indicated region of the source storage and/or the number of data values stored thereon. Moreover, by omitting the data associated with out-of-bounds memory accesses when writing to the target storage, both a step of writing the out-of-bounds data and a step of overwriting the out-of-bounds data with an appropriate padding value may be eliminated, leading to faster, less time-consuming data loading with reduced bandwidth and power requirements.

According to an alternative approach, the data transfer instruction specifies a padding value to be used in respect of out-of-bounds memory accesses. When a source storage, e.g. memory, is accessed to load data from an indicated region of the source storage to a target storage, e.g. register storage, the data (not associated with out-of-bounds memory accesses) read from the indicated region of the source storage is written to the target storage. If the data transfer operation comprises at least one out-of-bounds memory access, data associated with the at least one out-of-bounds memory access is omitted from the target storage; instead, the padding value specified in the data transfer instruction is written to the target storage. In doing so, (non out-of-bounds) data read from the indicated region of the source storage is written to a first portion of the target storage, while the padding value specified in the data transfer instruction is written to the remaining, second, portion of the target storage. As such, irrespective of the amount of data to be read from the indicated region of the source storage, the target storage is always filled by the desired values only-non out-of-bounds data or the padding value specified in the data transfer instruction. Thus, in the event that e.g. there are fewer data values than memory locations on the target storage, memory locations on the target storage that are not written with a data value is written instead with a padding value specified in the data transfer instruction.

Similar to the first approach, the present second approach can be implemented in many different applications, in particular in data processing operations that require a specific number of elements and accept only padding values specific to the data processing operations. Through embodiments of the present technology, data read from the indicated region of the source storage is written to a portion (first portion) of a target storage, while data associated with out-of-bounds memory accesses are omitted and a padding value specified in the data transfer instruction is instead written to the remaining portion (second portion) of the target storage, such that the desired number of elements with appropriate padding values are ensured.

By omitting the data associated with out-of-bounds memory accesses when writing to the target storage and instead writing the specified padding value, the present second approach ensures the target storage has stored thereon the desired number of elements, being data values or appropriate padding values, without the need to first writing the out-of-bounds data and then overwriting the out-of-bounds data with the appropriate padding value, leading to faster, less time-consuming data loading with reduced bandwidth and power requirements.

Compared to conventional approaches, through implementation of the present approaches, processing and memory resources can be conserved by removing the need to copy tensor data and padding the copy when the tensor data does not meet the required dimension, and performance is maintained by negating the need to revert to less efficient implementations of operations when copying the tensor data is undesirable.

Further, since the steps of writing data values read from the indicated region the source storage to the target storage are always the same irrespective of the number of data values stored in the indicated region of the source storage, the present approach removes the need to determine the dimension of tensor data prior to writing to the target storage, the need to determine the number of padding values required to bring the tensor data to the desired dimension, or the need to first write the data associated with out-of-bounds memory accesses (e.g. 0) then to overwrite the data associated with out-of-bounds memory accesses with the appropriate padding values. Thus, the present approach can improve processing and power consumption efficiency by reducing the amount of processing required.

In an example, a data processing apparatus comprises instruction decoding circuitry for decoding instructions and processing circuitry for performing data processing in response to instructions decoded by the instruction decoding circuitry. Storage (e.g. one or more registers) is provided to store data that can be used to by the processing circuitry. When the processing circuitry generates a processing result by performing an operation in response to an instruction, the processing result can be written to the storage e.g. to be used in further stages of the operation or to be written back to system memory.

The transfer of data to and from the storage may be performed by means of a data transfer instruction. In response to a data transfer instruction, the instruction decoding circuitry controls the processing circuitry to perform a data transfer operation, which comprises transferring data to (or from) a target portion of the storage (target storage) e.g. from a source storage such as a location within the system memory. In embodiments of the present technology, the data transfer instruction specifies a source storage to be accessed for data and a target storage to which the data is transferred.

In typical data transfer instructions, a register (or multiple registers) may be selected for use as the target storage, which may be identified in the data transfer instruction encoding, which e.g. specifies the architectural register to which data is to be transferred. For example, the register or registers to be selected may include an integer register, floating-point register, vector register, or a combination thereof.

In some examples, the target storage comprise one-dimensional register storage for storing one-dimensional data values. In one example, the target storage comprises multidimensional, e.g. two-dimensional (2D), array register storage to store at least one multidimensional, e.g. 2D, data array. In this example, the data transfer instruction may be an array data transfer instruction to transfer at least a part of a multidimensional, e.g. 2D, data array to the target portion of the array data storage. Multidimensional arrays, such as tensors, are useful for a wide range of processing applications. One example is in the field of machine learning, where tensor operations are performed for inference and training algorithms for many types of machine learning models. Other applications may of course also use matrix arithmetic, such as in the fields of augmented reality, virtual reality, computer vision, computational photography, scientific simulation, digital signal processing, and so on. Thus, improving data transfer involving matrices/tensors can be useful in supporting a wide range of applications.

Herein, the terms "horizontal" and "vertical" are used to refer to the "row" and "column" directions of a 2D data array as seen from the perspective of 2D array storage. The "horizontal" and "vertical" directions refer to the logical arrangement of the elements in a 2D array. It will be appreciated that the physical layout of the storage may not necessarily be arranged in a 2D grid of storage elements; it is possible to physically dispose the storage elements at any position that is convenient within an integrated circuit layout.

Further, the "horizontal" and "vertical" directions associated with a 2D array stored in the 2D array register storage may not necessarily correspond to the same row and column layout of array data structures stored in system memory (source storage). It will therefore be appreciated that a horizontal group of elements in the target storage may represent either a row or a column of elements from an array structure in memory. Similarly, a vertical group of elements in the target storage may represent either a row or a column of elements from the array structure in memory (or a newly computed set of elements which may subsequently be written back either to a row or a column of elements in a matrix structure in memory). For the avoidance of doubt, the terms "row" and "column" will be used in the following discussion to refer to the arrangement of elements in memory, while the terms "horizontal elements" and "vertical elements" will be used to refer to the arrangement of elements in the data array stored in the target storage.

In some implementation, a data transfer instruction according to the present technology may be configured to support the transferring of data to (or from) the target storage in only one of the horizontal or vertical direction. However, in other, preferred, examples, the instruction set architecture (ISA) may support writing (or reading) to the register storage in both the horizontal and vertical directions. For example, a data transfer instruction may specify an array direction identifying one or a horizontal direction or a vertical direction.

In some implementation, a data transfer instruction according to the present technology may be used in embodiments that handle data arrays defined with a fixed data element size (the number of bits in one single element of the data array). However, it may be useful to configure the data transfer instruction to support variable data element sizes, so that the data transfer instruction may be used for applications that process matrices defined using data values of different levels of precision.

The techniques described herein may be implemented within a data processing apparatus that comprises hardware circuitry provided for implementing the instruction decoder and processing circuitry described herein.

Alternatively, the present techniques may be implemented within a computer program that executes on a host data processing apparatus (e.g. a CPU) to provide an instruction execution environment for execution of target code. Such a computer program may control the host data processing apparatus to simulate the architectural environment that would be provided on a target data processing apparatus which supports the target code according to a certain ISA, even if the host data processing apparatus itself does not support that architecture.

For example, the computer program may comprise instruction decoding program logic that decodes program instructions of the target code to control the host data processing apparatus to perform data processing in response to the program instructions (e.g. mapping each instruction of the target code to a sequence of one or more instructions in the native instruction set of the host which implements equivalent functionality). The computer program may have storage emulating program logic that maintains a data structure in host storage of the host data processing apparatus (e.g. in registers or memory of the host) to emulate the target storage of the target ISA being simulated. In such an implementation, the instruction decoding program logic may support a data transfer instruction as described above, but in this example references to the target storage in relation to the data transfer instruction are mapped to corresponding locations of the storage emulating data structure stored in the host storage.

FIG. 1 schematically illustrates an exemplary data processing apparatus 20. The data processing apparatus has a processing pipeline 24 which includes a number of pipeline stages. In the present example, the pipeline stages include a fetch stage 26 for fetching instructions from an instruction cache 28; a decode stage 30 (instruction decoding circuitry) for decoding the fetched program instructions to generate micro-operations to be processed by remaining stages of the pipeline; an issue stage 32 for checking whether operands required for the micro-operations are available in a register file 34 and issuing micro-operations for execution once the required operands for a given micro-operation are available; an execution stage 36 (processing circuitry) for executing data processing operations corresponding to the micro-operations, by processing operands read from the register file 34 to generate result values; and a writeback stage 38 for writing the results of the processing back to the register file 34. It will be appreciated that this present example represents merely one example of possible pipeline architecture, and other systems may have additional stages or a different configuration of stages. For example, in an out-of-order processor a register renaming stage could be included for mapping architectural registers specified by program instructions or micro-operations to physical register specifiers identifying physical registers in the register file 34.

In the present example, the execution stage 36 includes a number of processing units for executing different classes of processing operation. For example, the execution units may include a scalar arithmetic/logic unit (ALU) 40 for performing arithmetic or logical operations on scalar operands read from the register 34; a floating point unit 42 for performing operations on floating-point values; a branch unit 44 for evaluating the outcome of branch operations and adjusting the program counter which represents the current point of executing accordingly; a matrix processing unit 46 for matrix processing; and a load/store unit 48 for performing load/store operations to access data in a memory system 50, 52, 54. The memory system includes, in the present example, a level one data cache 50, a shared level two cache 52, and main system memory 54.

It will be appreciated that the specific types of processing units 40 to 48 shown in the execution stage 36 are merely one example of implementation, and other implementations may have a different set of processing units or may include multiple instances of the same type of processing unit so that multiple micro-operations of the same type can be handled in parallel. Further, it will be appreciated that this is merely one example of a possible memory hierarchy and other arrangements of caches may of course be provided. It will be appreciated that FIG. 1 is merely a simplified representation of some components of a possible processor pipeline architecture, and the processor may include many other elements not illustrated herein.

Embodiments of the present technology propose a different approach for loading data such as a tensor from memory to a target storage such as register storage. In particular, it is proposed that a target storage to which data e.g. a tensor is written may be preloaded with a predetermined value (all storage locations in the target storage are set to the preloaded value, e.g. an appropriate padding value), and when writing the data to the target storage, the predetermined value in the target storage is overwritten by the data. In doing so, irrespective of the number of data values comprised in the data (the dimension of the data tensor), the target storage always has the desired number of values (each location has either a data value or the preloaded value).

In an example of a data processing system (e.g. a graphics processing system), an execution engine may implement load instructions (e.g. LD_CHECKED) when data from a resource is required e.g. for a data processing operation. A load instruction may take as input (1) the base address of the resource being accessed; (2) the offset into the resource from which to start fetching data; and (3) the size of the resource, then load a vector of data (the size of which is encoded in the instruction) from the resource and write the vector of data to one or more registers in the execution engine. As a register is being written, if the data specified by the resource base address and size has all been fetched but the register is not yet filled, the load instruction would write a predetermined value, e.g. 0, to the register at memory locations that require a value. In doing so, the execution engine is able to perform vector loads that straddle the boundary of the resource being accessed without resulting in out-of-bounds memory accesses.

According to the embodiments, a target storage, e.g. a register, to which data is to be written may be preloaded (all memory locations written) with a predetermined value, e.g. a padding value specified for an operation. Moreover, according to present embodiments, operation of a load instruction (data transfer instruction) is configured, instead of writing 0s to remaining memory locations in the target storage that are associated with out-of-bounds memory accesses, to simply stop writing to the target storage when all data values from the specified resource base address and size have been loaded to the target storage. Then, performance of the load instruction loads data from the resource to the target storage by overwriting the preloaded values in the register at memory locations in the target storage that correspond e.g. to the data positions in a data tensor, until all the data (specified by the resource base address and size) is loaded to the target storage, at which point the load instruction stops writing, preserving the preloaded values in the remaining portion of the target storage.

In an alternative approach, a predetermined padding value may be specified in a load instruction, and operation of the load instruction is configured, instead of writing 0s to the target storage for out-of-bounds memory accesses, to write the predetermined padding value specified in the load instruction to the target storage. In particular, performance of the load instruction loads data from a resource to the target storage until all the data (specified by the resource base address and size) is loaded to the target storage, and in addition, performance of the load instruction writes the predetermined padding value specified in the load instruction to the remainder of the target storage.

Figure 2:
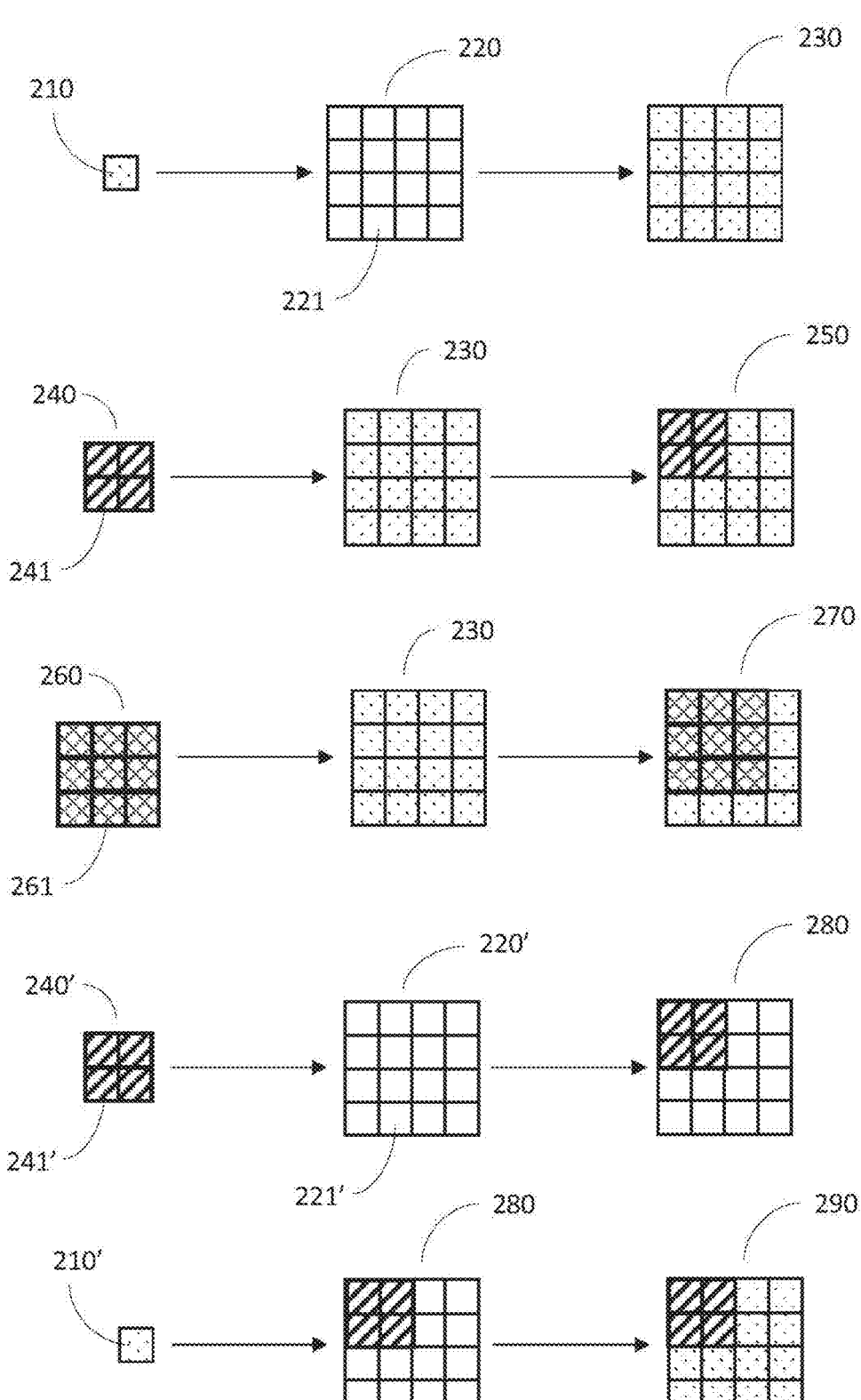
FIG. 2 illustrates an exemplary data transfer according to an embodiment.

Examples illustrating embodiments of the present technology are shown in FIG. 2. A target storage 220 (e.g. one or more registers) comprising a plurality of storage locations 221 is preloaded with a predetermined value 210. This may be done offline any time before a load instruction (data transfer instruction) is received. Data 240 comprising a plurality of data values 241 is fetched from a source location specified in a load instruction (or data transfer instruction) and is written to the preloaded target storage 230. As described above, the load instruction is configured to omit any out-of-bounds memory accesses of the resource and instead writing to the preloaded target portion of the register storage 230 is stopped when all the data values 241 have been written. Through implementation of the embodiments, once the data 240 is written to the preloaded target portion of the register storage 230, the resulting target portion of the register storage 250 would always have stored thereon the desired number of values.

This may be particularly useful if the data 240 to be fetched and loaded to the target portion of the register storage is to be used in an operation, and the operation may require (can only handle) data with data values arranged e.g. in a tensor of a predetermined dimension (e.g. a 4×4 data array), for example a machine learning operation. In this case, the target storage may be a storage associated with the operation that has the predetermined dimension, then, irrespective of the dimension of, or number of data values in, the data 240 (in this example a 2×2 data array), the resulting data tensor 250 read from the target storage is ensured to have the desired predetermined dimension.

In another example, an operation may require input data to be divided into a plurality of groups of a predetermined number of data values (a data tensor of a predetermined dimension) to process, in which case padding values appropriate for the operation may need to be appended to the input data such that the resulting number of values (data tensor) is divisible by the predetermined number, or remainder processing may be required to process remaining data values that cannot be formed into groups. As illustrated in FIG. 2, data 260 comprising a plurality of data values 261 arranged in a 3×3 data array is fetched from a source location specified in a load instruction (or data transfer instruction) and is written to the preloaded target storage 230, then any out-of-bounds memory accesses of the resource are omitted. In this example, the data 260 may be fetched for an operation that is configured e.g. to divide input data into groups of 2×2 data array. By specifying a predetermined dimension, e.g. 4×4, for the target storage (or number of predetermined values to be preloaded to the target portion), once the data 260 is written to the preloaded target portion of the register storage 230, the resulting target storage 270 is ensured to have stored thereon the number of values that is divisible into groups required by the operation.

In an alternative example, data 240' comprising a plurality of data values 241' is fetched from a source location specified in a load instruction (or data transfer instruction) and is written to a target storage 220'. Once the data 240' is loaded to the target storage 220', any out-of-bounds memory accesses of the resource are omitted. In this example, the target storage 220' is not preloaded with padding values; instead, a predetermined padding value 210' specified in the load instruction is written to the target storage 280 in the remaining memory locations. The resulting target storage 290 thus has stored thereon the data 240' padded with the predetermined padding value 210'.

The present approach is of particular relevance to machine learning systems, in which data to be processed, generated, and/or stored is typically arranged in data tensors. For example, in a neural network, when data is exchanged between a first layer and a second layer, the two layers may handle data in tensors of different dimensions. Through implementation of the present approach, it is possible to ensure that the second layer receives data tensors in the dimension required by the second layer, irrespective of the dimension of data tensors output by the first layer.

Figure 3:
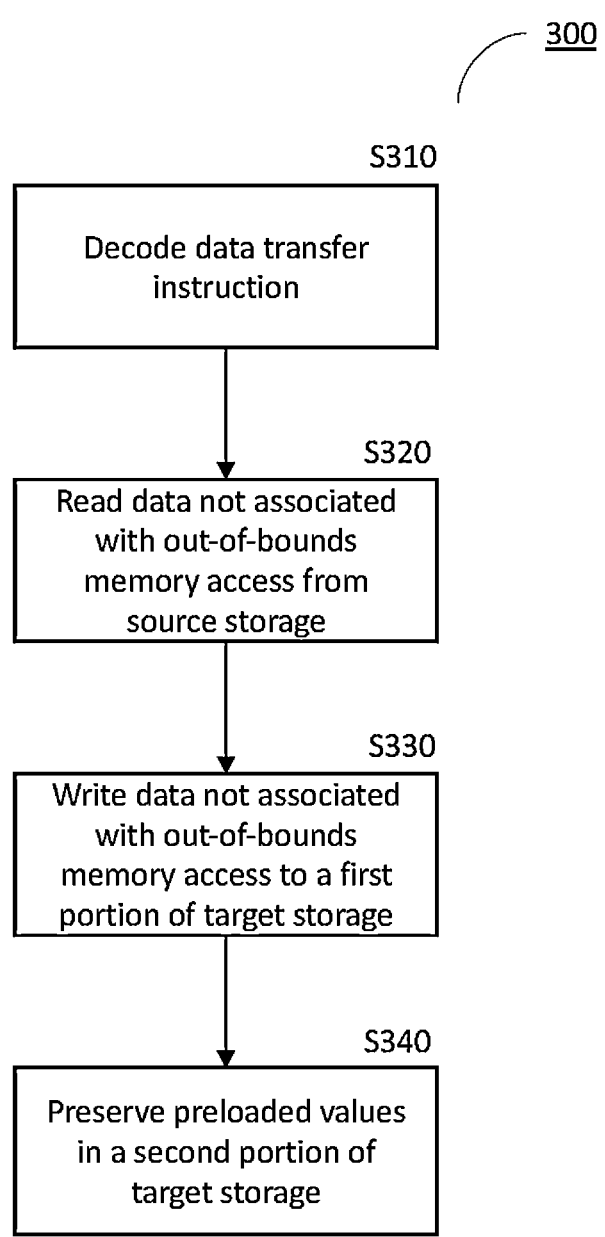
FIG. 3 shows a flow diagram of an exemplary method of data transfer according to an embodiment.

An exemplary method according to embodiments of the present technology is shown in FIG. 3. The method 300 begins at S310, when a data transfer instruction (load instruction) is decoded. The data transfer instruction specifies, amongst other things, a source storage to be accessed for data and an indication of a region of the source storage to perform a data transfer operation. For example, the indication of the region of the source storage may comprise a start location of the source storage and a size of the source storage.

In response to the data transfer instruction, a data transfer operation is performed. If the data transfer operation comprises at least one out-of-bounds memory access, wherein the at least one out-of-bounds memory access corresponds to an attempt to read data that is outside of the indicated region of the source storage specified in the data transfer instruction, then at S320, data that is not associated with the at least one out-of-bounds memory access is read from the source storage.

In one approach, the target storage may be preloaded with a predetermined value prior to the data transfer instruction. At S330, the data that is not associated with the at least one out-of-bounds memory access is written to a first portion of a target storage by overwriting the preloaded values stored in the first portion of the target storage.

At S340, once the data not associate with the at least one out-of-bounds memory access has been read from the indicated region of the source storage and is written to the preloaded target storage, the data transfer operation stops. In particular, any writing of data associated with the at least one out-of-bounds memory access to a different second portion of the target storage is omitted so as to preserve preloaded values stored in the second portion of the target storage.

Figure 4:
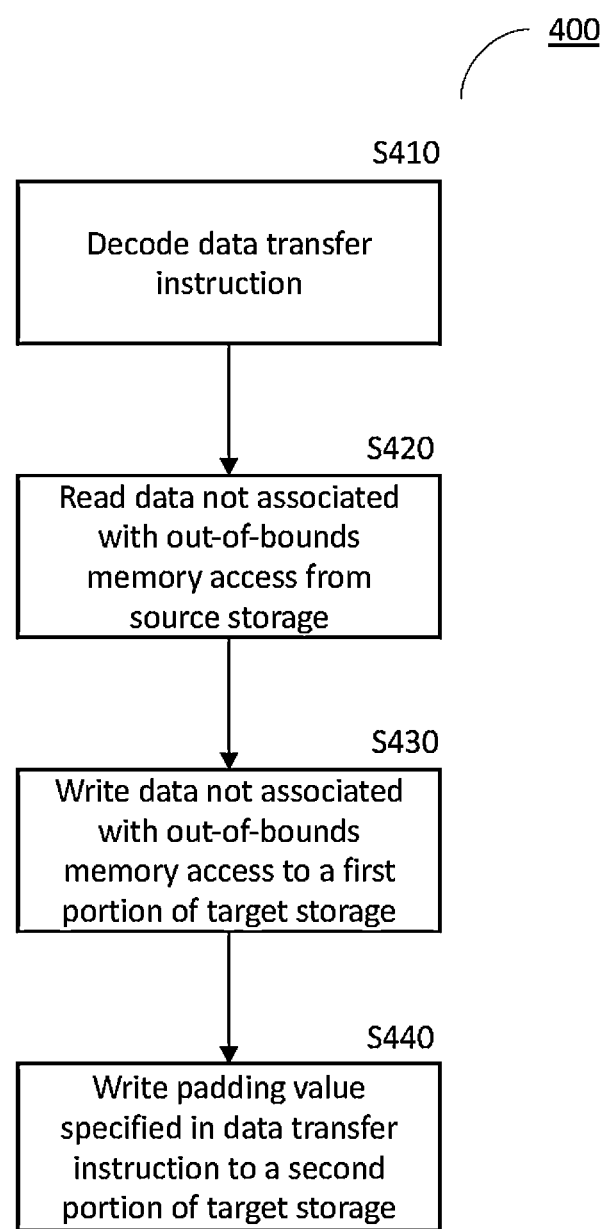
FIG. 4 shows an exemplary simulator for implementing embodiments of the present technology.

An alternative exemplary method according to embodiments of the present technology is shown in FIG. 4. The method 400 begins at S410, when a data transfer instruction (load instruction) is decoded. The data transfer instruction specifies, amongst other things, a source storage to be accessed for data and an indication of a region of the source storage to perform a data transfer operation. For example, the indication of the region of the source storage may comprise a start location of the source storage and a size of the source storage.

In response to the data transfer instruction, a data transfer operation is performed. If the data transfer operation comprises at least one out-of-bounds memory access, wherein the at least one out-of-bounds memory access corresponds to an attempt to read data that is outside of the indicated region of the source storage specified in the data transfer instruction, then at S420, data that is not associated with the at least one out-of-bounds memory access is read from the source storage.

In the alternative approach, the target storage need not be preloaded with a predetermined value prior to the data transfer instruction. At S430, the data that is not associated with the at least one out-of-bounds memory access is written to a first portion of a target storage.

At S440, any writing of data associated with the at least one out-of-bounds memory access to a different second portion of the target storage is omitted, and instead, the padding value specified in the data transfer instruction is written to a different second portion of the target storage.

In the embodiment of FIG. 4, the writing of the data not associated with the at least one out-of-bounds memory access need not be performed before the writing of the specified padding value. The two steps may be performed in different order or in parallel if desired.

Figure 5:
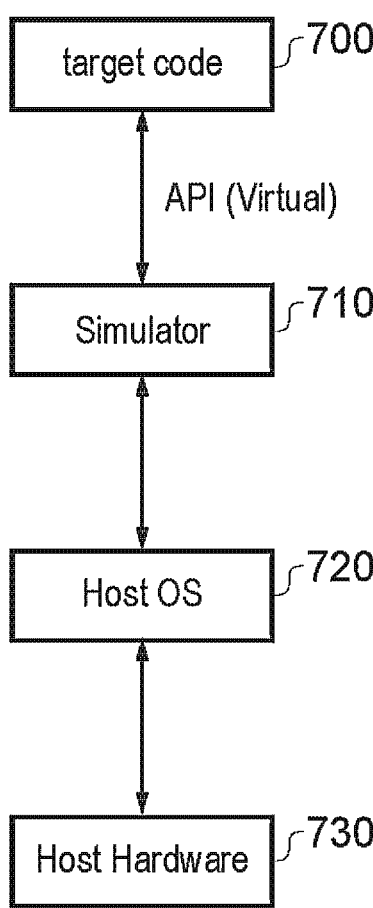
FIG. 5 is a schematic diagram of an implementation of a simulator.

In an alternative embodiment, FIG. 5 illustrates a simulator implementation of the present technology. Whilst the earlier described embodiments implement the present technology in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory storage medium), and provides a program interface (instruction execution environment) to target code 700 which is the same as the application program interface of the hardware architecture being modelled by the simulator program 710. Thus, the program instructions of the target code 700, such as the methods 300 and 400 described above, may be executed from within the instruction execution environment using the simulator program 710, so that a host computer 730 which does not actually have the hardware features of the apparatus discussed above can emulate these features.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a non-transitory computer readable medium having computer readable program code embodied thereon. The computer readable medium may be a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. An apparatus comprising:
   instruction decoding circuitry to decode instructions;
   storage to store data; and
   processing circuitry to perform data processing in response to an instruction decoded by the instruction decoding circuitry,
   wherein the instruction decoding circuitry is configured to, in response to a data transfer instruction specifying a source storage to be accessed for data and an indication of a region of the source storage to perform a data transfer operation, control the processing circuitry to:
   when the data transfer operation comprises at least one out-of-bounds memory access, wherein the at least one out-of-bounds memory access corresponds to an attempt to read data that is outside of the region of the source storage to perform the data transfer operation, read data not associated with the at least one out-of-bounds memory access from the source storage and write the data not associated with the at least one out-of-bounds memory access to a first portion of a target storage by overwriting preloaded values stored in the first portion of the target storage; and
   omit writing, to a different second portion of the target storage, data associated with the at least one out-of-bounds memory access to preserve preloaded values stored in the different second portion of the target storage.

2. The apparatus of claim 1, wherein the target storage has stored therein a plurality of preloaded values.

3. The apparatus of claim 1, wherein the indication of the region of the source storage comprises a start location of the source storage and a size of the source storage.

4. The apparatus of claim 1, wherein the processing circuitry is configured to determine the at least one out-of-bounds memory access based on the indication of the region of the source storage and a size of the target storage.

5. The apparatus of claim 1, wherein the processing circuitry is configured to, in a first out-of-bound operation mode, handle the at least one out-of-bounds memory access by returning a predetermined value as the data associated with the at least one out-of-bounds memory access.

6. The apparatus of claim 1, wherein the processing circuitry is configured to select a second out-of-bounds operation mode to disregard the data associated with the at least one out-of-bounds memory access.

7. The apparatus of claim 1, wherein:
   the target storage comprises multi-dimensional array register storage to store at least one multi-dimensional array of data.

8. A computer-implemented method comprising:
   operating instruction decoding circuitry to decode instructions;
   operate storage to store data; and
   operate processing circuitry to perform data processing in response to an instruction decoded by the instruction decoding circuitry,
   the method further comprising, in response to a data transfer instruction decoded by the instruction decoding circuitry specifying a source storage to be accessed for data and an indication of a region of the source storage to perform a data transfer operation, the processing circuitry:
   when the data transfer operation comprises at least one out-of-bounds memory access, wherein the at least one out-of-bounds memory access corresponds to an attempt to read data that is outside of the region of the source storage to perform the data transfer operation, reading data not associated with the at least one out-of-bounds memory access from the source storage and writing the data not associated with the at least one out-of-bounds memory access to a first portion of a target storage by overwriting preloaded values stored in the first portion of the target storage; and
   omitting writing to a different second portion of the target storage the data associated with the at least one out-of-bounds memory access to preserve preloaded values stored in the different second portion of the target storage.

9. The method of claim 8, further comprising storing a plurality of preloaded values in the target storage.

10. The method of claim 8, wherein the indication of the region of the source storage comprises a start location of the source storage and a size of the source storage.

11. The method of claim 8, wherein the processing circuitry is configured to determine the at least one out-of-bounds memory access based on the indication of the region of the source storage and a size of the target storage.

12. The method of claim 8, further comprising, in a first out-of-bound operation mode, the processing circuitry handle the at least one out-of-bounds memory access by returning a predetermined value as the data associated with the at least one out-of-bounds memory access.

13. The method of claim 8, further comprising the processing circuitry selecting a second out-of-bounds operation mode to disregard the data associated with the at least one out-of-bounds memory access.

14. The method of claim 8, wherein:

the target storage comprises multi-dimensional array register storage to store at least one multi-dimensional array of data.

15. A computer program product stored in a non-transitory computer-readable medium and comprising computer program instructions for controlling a host data processing apparatus to provide an instruction execution environment comprising:

instruction decoding program logic to decode instructions;

storage logic to store data; and processing program logic to perform data processing in response to an instruction decoded by the instruction decoding circuitry, wherein, the instruction decoding program logic is configured to, in response to a data transfer instruction specifying a source storage to be accessed for data and an indication of a region of the source storage to perform a data transfer operation, control the processing program logic to:

when the data transfer operation comprises at least one out-of-bounds memory access, wherein the at least one out-of-bounds memory access corresponds to an attempt to read data that is outside of the region of the source storage to perform the data transfer operation, read data not associated with the at least one out-of-bounds memory access from the source storage and write the data not associated with the at least one out-of-bounds memory access to a first portion of a target storage by overwriting preloaded values stored in the first portion of the target storage; and omit writing to a different second portion of the target storage the data associated with the at least one out-of-bounds memory access to preserve preloaded values stored in the different second portion of the target storage.

* * * * *